(12) United States Patent
Devarapalli et al.

(10) Patent No.: US 11,879,089 B1
(45) Date of Patent: Jan. 23, 2024

(54) LOST CIRCULATION MATERIAL PACKAGE WITH TAILORED PARTICLE SIZE DISTRIBUTION

(71) Applicant: Halliburton Energy Services, Inc., Houston, TX (US)

(72) Inventors: V Ramireddy Devarapalli, Pune (IN); Alexandra Clare Morrison, Houston, TX (US); Sudarshana Mukherjee, Pune (IN); Sunita S Kadam, Pune (IN); Jay Deville, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/057,850

(22) Filed: Nov. 22, 2022

(51) Int. Cl.
*E21B 21/00* (2006.01)
*C09K 8/035* (2006.01)
*C09K 8/504* (2006.01)

(52) U.S. Cl.
CPC ............ *C09K 8/035* (2013.01); *C09K 8/5045* (2013.01); *E21B 21/003* (2013.01); *C09K 2208/08* (2013.01)

(58) Field of Classification Search
None
See application file for complete search history.

(56) References Cited

U.S. PATENT DOCUMENTS

| | | | |
|---|---|---|---|
| 6,399,545 B1 * | 6/2002 | Rose | C09K 8/035 507/104 |
| 10,035,941 B2 | 7/2018 | Whitfill et al. | |
| 11,359,131 B2 | 6/2022 | Whitfill et al. | |
| 2009/0029878 A1 * | 1/2009 | Bicerano | C09K 8/035 507/140 |
| 2009/0221452 A1 * | 9/2009 | Whitfill | C09K 8/508 507/104 |
| 2011/0183874 A1 | 7/2011 | Ghassemzadeh | |
| 2017/0137688 A1 * | 5/2017 | Amanullah | C09K 8/516 |
| 2017/0369757 A1 * | 12/2017 | Pisklak | E21B 21/003 |
| 2020/0394350 A1 * | 12/2020 | Wang | E21B 21/003 |
| 2021/0087459 A1 * | 3/2021 | Patil | C04B 28/02 |

FOREIGN PATENT DOCUMENTS

| | | |
|---|---|---|
| EP | 2324094 B1 | 7/2018 |
| WO | 2016076745 A1 | 5/2016 |
| WO | 2021236114 A1 | 11/2021 |

\* cited by examiner

*Primary Examiner* — Andrew Sue-Ako
(74) *Attorney, Agent, or Firm* — Sheri Higgins; Sheri Higgins Law, PLLC

(57) ABSTRACT

A treatment fluid can include a base fluid and a lost-circulation package. The lost-circulation package can include plurality of particles of a first, second, and third lost-circulation material. The plurality of particles can be cellulose, sized calcium carbonate, and fibers. The particle size distribution of the plurality of particles can be selected such that the particles enter permeable areas of a subterranean formation to help prevent loss of the base fluid into the formation and allow most of the particles to pass through the screen of a shale shaker. The plurality of particles can have a particle size distribution of a d10 value in the range of 30 to 55 microns, a d50 value in the range of 60 to 100 microns, and a d90 value in the range of 130 to 190 microns. The treatment fluid can be used in an oil and gas operation.

19 Claims, 1 Drawing Sheet

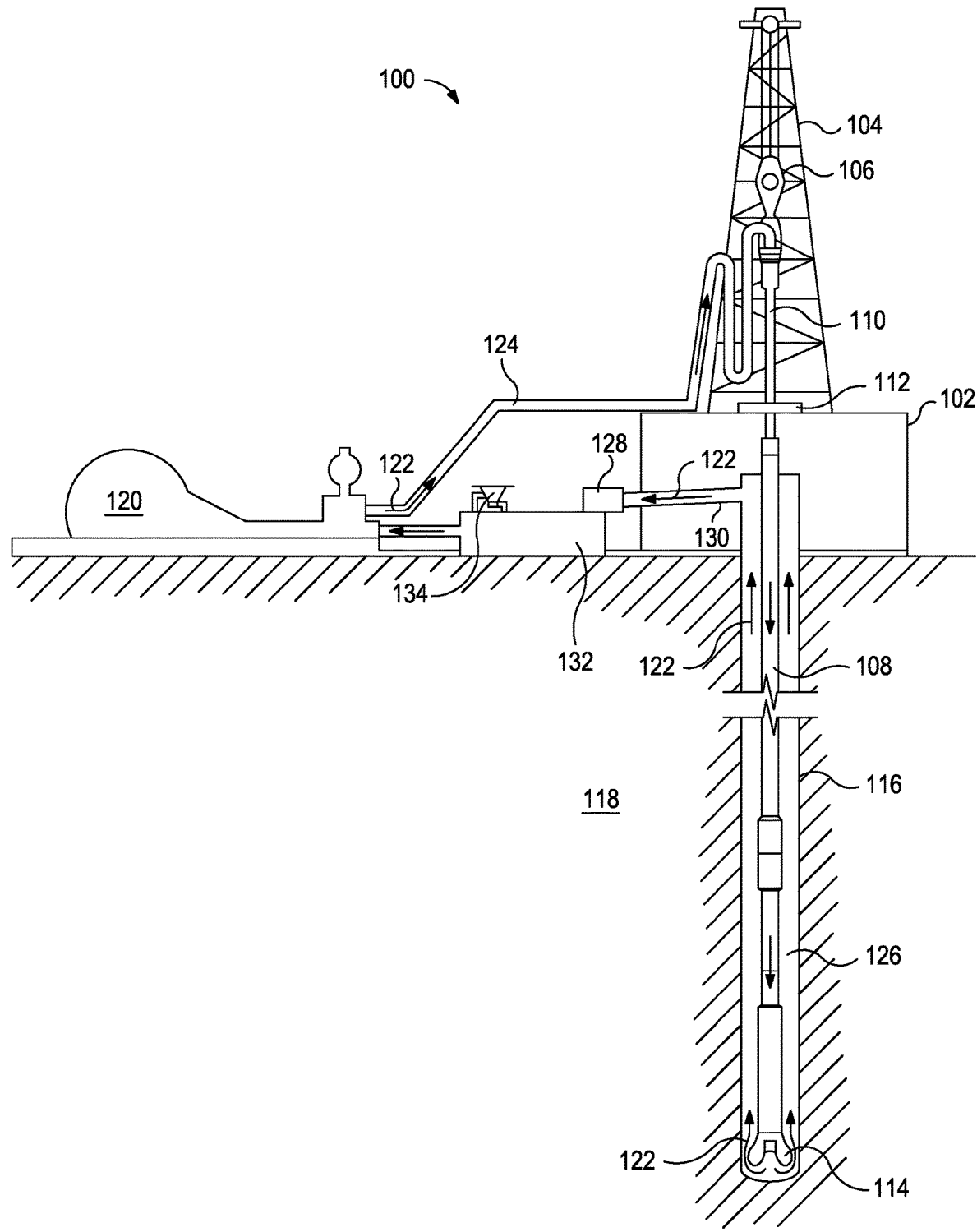

LOST CIRCULATION MATERIAL PACKAGE WITH TAILORED PARTICLE SIZE DISTRIBUTION

TECHNICAL FIELD

Wellbore drilling operations can involve circulating a drilling fluid into a subterranean formation to form a wellbore. The drilling fluid can include a liquid base fluid and insoluble particles as a lost circulation material. A plurality of particles of a lost circulation material ("LCM") package can have a tailored particle size distribution such that the LCM can plug permeable areas of the subterranean formation and pass through a shaker screen.

BRIEF DESCRIPTION OF THE FIGURES

The features and advantages of the embodiments will be more readily appreciated when considered in conjunction with the accompanying FIGURES. The figures are not to be construed as limiting any of the embodiments.

FIG. 1 illustrates a system for introducing a treatment fluid into a subterranean formation.

DETAILED DESCRIPTION

Oil and gas hydrocarbons are naturally occurring in some subterranean formations. In the oil and gas industry, a subterranean formation containing oil and/or gas is referred to as a reservoir. A reservoir can be located under land or offshore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include but are not limited to the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

Oil or gas operations can be performed using a treatment fluid. The term "treatment fluid" refers to the specific composition of the fluid as it is being introduced into a well. The word "treatment" in the term "treatment fluid" does not necessarily imply any particular action by the fluid. Examples of treatment fluids include, but are not limited to, drilling fluids, spacer fluids, workover fluids, cement compositions, and stimulation fluids.

A wellbore is formed using a drill bit. A drill string can be used to aid the drill bit in drilling through the subterranean formation to form the wellbore. The drill string can include a drilling pipe. During drilling operations, a drilling fluid, sometimes referred to as a drilling mud, may be circulated downwardly through the drilling pipe, and back up the annulus between the wellbore and the outside of the drilling pipe. The drilling fluid is generally a slurry or an emulsion and contains a liquid continuous phase and soluble and/or insoluble additives. The drilling fluid performs various functions, such as cooling the drill bit, maintaining the desired pressure in the well, and carrying drill cuttings upwardly through the annulus between the wellbore and the drilling pipe. Drilling fluid returned from the wellbore to the surface can be flowed through a shale shaker screen that has appropriately sized holes to retain the drill cuttings. The drilling fluid can then be re-introduced into the formation to continue with the drilling operation and continue being circulated down the drilling pipe, up through the annulus, through the shale shaker, and back into the drilling pipe.

During well completion, it is common to introduce a cement composition into a portion of an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, or gravel packing operations. As used herein, a "cement composition" is a mixture of at least cement and water as the base fluid. A cement composition can include additives. As used herein, the term "cement" means an initially dry substance that develops compressive strength or sets in the presence of water. A cement composition is generally a slurry in which the water is the base fluid or the continuous liquid phase of the slurry and the cement, and other undissolved solids, make up the dispersed phase of the slurry.

The wellbore wall and near-wellbore region of the subterranean formation can include permeable areas. Examples of permeable areas include cracks, natural fissures, fractures, vugs, interconnected pores, or induced fractures. Cracks, fissures, and fractures can generally be characterized as having a length greater than its diameter. Vugs and holes can be characterized as being any cavity having a variety of shapes and sizes. Porosity refers to the number of individual pores within an area of the subterranean formation. Permeability and all grammatical variations thereof, in this context, refers to the amount of interconnectivity between the individual pores that allows fluid to migrate or move between the interconnected pores. Permeable areas in the wall of the wellbore and near-wellbore region can vary and can have dimensions ranging from 0.1 micrometers and as large as 50 micrometers or larger. As used herein, a "permeable area" means any area where fluid can flow into the subterranean formation via a wellbore and can be caused by—without limitation—cracks, fissures, fractures, cavities, and interconnected pores.

A treatment fluid, such as a drilling fluid or cement composition, can encounter lost circulation. Lost circulation means that an undesirable portion of the base fluid flows into the subterranean formation instead of returning to the surface. In an ideal drilling situation, the drilling fluid is pumped through a tubing string and returns to the surface via an annulus. The drilling fluid is generally pumped at or above the hydrostatic pressure of the subterranean formation. The pressure of the drilling fluid, being greater than or equal to the pressure of the formation, helps prevent the formation from caving into the newly formed wellbore, and it also helps prevent the oil or gas from prematurely entering the wellbore. In an ideal cementing operation, the cement composition is placed in the portion of the well to be cemented. The cement composition remains in the portion of the well until the composition eventually sets.

However, during lost circulation of a drilling fluid, some or all of the base fluid can enter the subterranean formation via any permeable areas. If a sufficient amount of the base fluid flows into the formation, then the total amount of pressure exerted on the formation by the fluid can decrease substantially. This decreased pressure can allow formation fluids, such as oil or gas, to prematurely enter the wellbore. The uncontrolled release of formation fluids is called a blowout. Another potential consequence to lost circulation for a drilling fluid is dry drilling. Dry drilling can damage the drill bit or the drill string, among other things.

Moreover, during lost circulation of a cement composition, the water base of the base fluid can enter the subterranean formation. Because the cement in the composition requires water to hydrate and is what ultimately allows the composition to set, the loss of water to the formation can cause severe adverse impacts to the cementing operation. For example, the cement composition may never set. If this occurs, a new cementing job will have to be performed. Removing the un-set cement composition and running a new cement job can cost time and money.

In order to overcome the problems associated with lost circulation, materials, commonly called a lost-circulation material ("LCM"), have been used. LCMs are generally insoluble and non-swellable particles. Generally, the LCM is included in the treatment fluid. As the treatment fluid is introduced into the subterranean formation, the LCM can eliminate or lessen the amount of the base fluid that enters the formation. The particles of the LCM can build upon each other and form a bridge over or within the permeable areas of the formation. For example, if a fracture is present in the formation, then the particles of the LCM can form a non-porous bridge or layer over the fracture entrance near the wall of the wellbore. The bridge or layer can eliminate or reduce the amount of liquid entering the formation via the fracture.

Other lost-circulation materials can be used that form a filtercake to reduce or stop fluid loss. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that may include materials including water, a gelling agent, calcium carbonate, diatomaceous earth, and/or polymers, is introduced into the open-hole wellbore. The fluid flows into a desired portion of the well. The ingredients in the fluid form the filtercake. The filtercake can be used to bind fines, such as sand, together, and prevent fluid loss into the subterranean formation.

When a drilling fluid containing an LCM is returned to the surface and flowed through a shale shaker, it is desirable for the shaker screen to filter out drill cuttings but allow the LCM particles to pass through the screen with the drilling fluid to be recirculated. The size of the shaker screen can be different for each drilling operation. For example, the particle size of drill cuttings can range from a few micrometers up to centimeters. As used herein, "particle size" can be determined using dry sieve analysis. Sieve analysis uses a column of sieves with wire mesh screens of graded mesh size. A representative weighed sample of particles is poured into the top sieve, which has the largest screen openings. Each lower sieve in the column has smaller openings than the one above. At the base is a pan, called the receiver. The column is typically placed in a mechanical shaker, which shakes the column, usually for a set period, to facilitate exposing all of the material to the screen openings so that particles small enough to fit through the holes can fall through to the next layer. After the shaking is complete, the material on each sieve is weighed. It is to be understood that as used herein, "particle" does not mean a specific geometric shape as particles can be spherically shaped, fiber-shaped, or other geometric shapes. As used herein, the term "fiber" means a solid that is characterized by having a high aspect ratio of length to diameter. For example, a fiber can have an aspect ratio of length to diameter greater than 1.2:1. Particle size can be determined by using sieves.

Shaker screens can have different sizes. Screen mesh sizes are inversely related to the pore size or the size of the holes in the screen. Accordingly, as the mesh size increases, the pore size decreases. By way of example, an 80-mesh screen has a pore size of approximately 177 micrometers (also called microns), whereas a 100-mesh screen has a pore size of approximately 149 microns. The mesh or pore size of the shaker screen is generally determined by operators at the well site and is selected based on the anticipated particle size of the drill cuttings. In this manner, the majority—if not all—of the drill cuttings are retained within the shaker screen and not pumped back into the subterranean formation with the recirculated drilling fluid.

However, most LCM are too large to pass through the shaker screen and be recirculated back with the drilling fluid. Instead, they are retained with the drill cuttings in the screen. Consequently, additional lost-circulation materials must be added to the drilling fluid before the fluid is pumped back into the drill string. Not only does adding more LCM increase the expense of the drilling operation, but it also increases the time needed to complete the drilling operation. One way that operators have tried to combat this issue is to make the pore size of the screen larger, so the LCM particles pass through the screen. However, by increasing the screen pore size, not only do the LCM particles pass through but drill cuttings can also pass through. Re-circulating drill cuttings can cause several, serious issues with the drilling operation. Thus, there is a need and on-going industry wide concern for improved treatment fluids that include lost-circulation materials.

It has been discovered that different particles can be used as a lost-circulation material for plugging permeable areas of a subterranean formation. The particle-size distribution of the plurality of particles of the LCM can be selected such that the material reduces fluid loss into the formation and the majority of the particles also pass through a shale shaker screen. Particle-size distribution ("PSD") indicates the percentage of particles of a certain size (or in a certain size interval) in the whole. The PSD can also be a list of values or a mathematical function that defines the relative amount, typically by mass, of particles present according to size. For example, PSD can be determined after weighing particles in dry sieve analysis. To calculate the particle size distribution, the mass of the sample of each sieve is divided by the total mass to give a percentage retained on each sieve. The size of the average particle on each sieve is then analyzed to get a cut-off point or specific size range, which is then captured on a screen. The PSD can be quantified into size classes or fractions, such as d10, d50, and d90 by plotting the PSD on a graph. D10 means 10% of the particles have a particle size that is less than this value. D50 means 50% of the particles have a particles size less than and 50% greater than this value. The d50 value is also known as the median particle size. D90 means 90% of the particles have a particles size less than this value.

A treatment fluid can include: a base fluid; and a lost-circulation package comprising a plurality of particles of: (i) a first lost-circulation material, wherein the first lost-circulation material is cellulose; (ii) a second lost-circulation material, wherein the second lost-circulation material is sized calcium carbonate; and (iii) a third lost-circulation material, wherein the third lost-circulation material is fibers, wherein the plurality of particles has a particle size distribution of a d10 value in the range of 30 to 55 microns, a d50 value in the range of 60 to 100 microns, and a d90 value in the range of 130 to 190 microns.

Methods of treating a subterranean formation can include introducing the treatment fluid into the subterranean formation and causing or allowing at least a portion of the lost-circulation material to reduce loss of the base fluid into permeable areas of the subterranean formation.

It is to be understood that the discussion of any of the embodiments regarding the treatment fluid or any ingredient in the treatment fluid is intended to apply to all of the method and composition embodiments without the need to repeat the various embodiments throughout. Any reference to the unit "gallons" means U.S. gallons.

The treatment fluid can be used in a variety of oil or gas operations. The treatment fluid can be, for example, a drilling fluid, a spacer fluid, a cement composition, a workover fluid, or a stimulation fluid.

The treatment fluid can be a colloid, an emulsion, or an invert emulsion. The treatment fluid includes a base fluid. The base fluid can include dissolved materials or undissolved solids. The base fluid can include a hydrocarbon liquid, or an internal phase of the treatment fluid can include a hydrocarbon liquid. The hydrocarbon liquid can be selected from the group consisting of a fractional distillate of crude oil; a fatty derivative of an acid, an ester, an ether, an alcohol, an amine, an amide, or an imide; a saturated hydrocarbon; an unsaturated hydrocarbon; a branched hydrocarbon; a cyclic hydrocarbon; and any combination thereof. Crude oil can be separated into fractional distillates based on the boiling point of the fractions in the crude oil. An example of a fractional distillate of crude oil is diesel oil. The saturated hydrocarbon can be an alkane or paraffin. The paraffin can be an isoalkane (isoparaffin), a linear alkane (paraffin), or a cyclic alkane (cycloparaffin). The unsaturated hydrocarbon can be an alkene, alkyne, or aromatic. The alkene can be an isoalkene, linear alkene, or cyclic alkene. The linear alkene can be a linear alpha olefin or an internal olefin.

The base fluid or an internal phase of the treatment fluid can comprise water. The water can be selected from the group consisting of freshwater, seawater, brine, and any combination thereof in any proportion. The treatment fluid can further include a water-soluble salt. The water-soluble salt can be selected from the group consisting of sodium chloride, calcium chloride, calcium bromide, potassium chloride, potassium bromide, magnesium chloride, and any combination thereof. The treatment fluid can contain the water-soluble salt in a concentration in the range of about 5 to about 350 pounds per barrel (ppb) (19 to 1,353 kilograms per cubic meter "$kg/m^3$") of the water.

The treatment fluid includes the lost-circulation package. The lost-circulation package can include a plurality of particles of a first, second, and third lost-circulation material. The first, second, and third lost-circulation material can be different from each other. According to any of the embodiments, the first lost-circulation material is cellulose. Cellulose is a complex carbohydrate polymer consisting of oxygen, carbon, and hydrogen. More specifically, cellulose is a polysaccharide composed of a linear chain of β-1,4 linked d-glucose units with a degree of polymerization ranging from several hundred to over ten thousand. Cellulose can be synthetic or naturally derived from plants. The first lost-circulation material can be in a concentration in the range of 15% to 45% by weight of the lost-circulation package.

According to any of the embodiments, the second lost-circulation material is sized calcium carbonate. The sized calcium carbonate can be sized ground marble. The sized calcium carbonate can be acid soluble. The sized calcium carbonate can have a median particle size (d50) in the range of 3 to 10 micrometers (microns). The second lost-circulation material can be in a concentration in the range of 30% to 55% by weight of the lost-circulation package.

According to any of the embodiments, the third lost-circulation material is fibers. The fibers can be natural fibers or synthetic fibers. The fibers can be finely ground fibrous cellulosic material. The third lost-circulation material can be in a concentration in the range of 5% to 30% by weight of the lost-circulation package.

The lost-circulation package can further comprise a plurality of particles of a fourth, a fifth, and so on lost-circulation material (LCM). By way of example, a fourth LCM can be sized calcium carbonate, wherein the fourth LCM has a different median particle size from the second lost-circulation material. For example, if the second LCM has a d50 of 5 microns, then the fourth LCM can have a d50 in the range of 20 to 50 microns. An example of a fifth lost-circulation material can be ground grape pomace. Any of the additional lost-circulation materials can be in a concentration in the range of 0.5% to 10% by weight of the lost-circulation package. According to embodiments, the lost-circulation package does not include resilient graphitic carbon materials.

The plurality of particles will have a particle size distribution. According to any of the embodiments, the plurality of particles of the lost-circulation package has a particle size distribution of a d10 value in the range of 30 to 55 microns, a d50 value in the range of 60 to 100 microns, and a d90 value in the range of 130 to 190 microns. It is to be understood that for lost-circulation materials that are fibers, then the sizes listed are for the longest part of the fiber. The plurality of particles can also have a particle size distribution such that a desired percentage of the particles pass through the screen of a shale shaker after the treatment fluid is returned to the surface. The pore size of the screen can be pre-determined, for example by an operator at a specific well site, based in part on the anticipated particle size of drill cuttings. The screen size can be in the range of, for example, API screen size 80 to 120—having a pore size in the range of 125 to 177 microns. According to any of the embodiments, 80% to 100% of the plurality of particles of the lost-circulation package pass through a screen having a pore size greater than or equal to 105 microns (API 140 mesh); 85% to 100% pass through a screen having a pore size greater than or equal to 149 microns (API 100 mesh); and 90% to 100% pass through a screen having a pore size greater than or equal to 177 microns (API 80 mesh).

According to any of the embodiments, the lost-circulation package provides a desired fluid loss control. For example, a desired fluid loss control can be at least 70%, 80%, or 90% by volume of the base fluid is not lost through permeable areas of the subterranean formation. The particle size distribution of the plurality of particles of the lost-circulation package can be selected such that the lost-circulation materials provide the desired fluid loss control. The concentration of the first, second, and third lost-circulation materials and any additional lost-circulation materials can also be selected such that the lost-circulation package provides the desired fluid loss control.

According to any of the embodiments, the particle size distribution of the plurality of particles of the lost-circulation package is selected such that the plurality of particles plugs permeable areas of the subterranean formation having a largest dimension ranging from 10 to 190 microns. The concentration of the plurality of particles of the lost-circulation package can also be selected such that the plurality of particles plugs permeable areas of the subterranean formation having a largest dimension ranging from 10 to 190 microns. By way of example, the concentration of the plurality of particles of the lost-circulation package may need to be increased for permeable areas having a largest dimension of 190 microns compared to ones having a largest dimension of 50 microns. The concentration of each of the first, second, and third lost-circulation materials can also be adjusted in order for the lost-circulation package to plug the permeable areas. Additional lost-circulation materials, for example, a fourth LCM, a fifth LCM, and so on can also be added to the lost-circulation package and the concentrations adjusted in order for the lost-circulation package to plug the permeable areas. The ingredients selected for each of the lost-circulation materials of the lost-circulation package can also be selected such that the lost-circulation package plugs the permeable areas.

The plurality of particles of the lost-circulation package can be in a concentration in the range of 2 to 40 pounds per barrel ("ppb") of the base fluid. The plurality of particles of the lost-circulation package can be in a concentration in the range of 5 to 25 ppb of the base fluid.

The lost-circulation package can be used to inhibit or prevent fluid flow from a wellbore into a subterranean formation that is penetrated by the wellbore or also from the formation into the wellbore (depending on the specific oil or gas operation being performed) via the permeable areas. It should be understood that while some of the base fluid may penetrate into the subterranean formation, the majority of the base fluid should remain in the wellbore. Moreover, as used herein, the term "penetrate" and all grammatical variations thereof is not intended to preclude some penetration of a certain depth, for example, a few inches, into the formation, but rather is meant to include penetration of depths that would be considered in the industry as lost circulation, and could likely impair oil or gas operations or increase the cost of performing the oil or gas operation.

There can be a multitude of permeable areas comprising the same or different types of voids, such as fractures, fissures, vugs, or interconnected pores. The dimensions of the permeable areas can be different. By way of example, a fracture may have a length that is greater than 50 micrometers; while pores may have dimensions greater than 10 micrometers. The lost-circulation materials of the lost-circulation package may prevent or reduce fluid loss into permeable areas having dimensions in the range of 10 to 190 micrometers.

The methods can include introducing the treatment fluid into a subterranean formation. After introduction of the treatment fluid into the subterranean formation, a portion of the plurality of particles of the lost-circulation package can enter the permeable areas of the formation, for example by being compressed and squeezed into the permeable areas of the formation. The portion of the plurality of particles can enter a permeable area and begin to build upon each other at a location farther away from the wall of the wellbore first and then fill the entire permeable area, or the plurality of particles can build upon each other at a location closer to the wall of the wellbore and not fill the entire permeable area. According to any of the embodiments, the portion of the plurality of particles of the lost-circulation package forms a plug within the permeable areas of the subterranean formation.

A test treatment fluid can be used to determine the predicted performance in an oil or gas operation and the necessary lost-circulation materials to be used, the specific particle size distribution, and concentrations of the lost-circulation materials. For predictive performance, a test treatment fluid consisting of the base fluid and the lost-circulation package has a total fluid loss of less than 50 milliliters (mL) using a particle plugging test as described below having a pore size less than or equal to 200 micrometers at a pressure differential of 1,500 pounds force per square inch (psi) (10.3 megapascals "MPa") and a temperature of 160° F. (71° C.). The test treatment fluid can also have a spurt loss of less than 50 mL using the particle plugging test having a pore size less than or equal to 190 micrometers at a pressure differential of 1,500 psi and a temperature of 160° F. (71° C.).

It is to be understood that while the treatment fluid can contain other ingredients, it is the plurality of particles of the lost-circulation package that are primarily or wholly responsible for providing the requisite fluid loss control. For example, and as used herein, a "test treatment fluid" consisting essentially of, or consisting of, the base fluid and the lost-circulation package that includes the lost-circulation materials and in the same proportions as the treatment fluid can provide the desired fluid loss control. Therefore, it is not necessary for the treatment fluid to include other additives to achieve the desired fluid loss control. It is also to be understood that any discussion related to a "test treatment fluid" is included for purposes of demonstrating that while the treatment fluid being introduced into a wellbore may contain other ingredients, it is the lost-circulation package that provides the desired fluid loss control. Therefore, while it may not be possible to perform a test in a wellbore for the specific treatment fluid being introduced, one can formulate a test treatment fluid to be tested in a laboratory to identify if the ingredients and concentration of the ingredients will provide the desired fluid loss control.

The treatment fluid can also contain other ingredients, such as a viscosifier; a filtration control agent; a shale stabilizer; a weighting agent; a pH buffer; an emulsifier; an emulsifier activator (e.g., lime); a dispersion aid; a corrosion inhibitor; an emulsion thinner; an emulsion thickener; a gelling agent; a surfactant; a foaming agent; a gas; a breaker; a biocide; a chelating agent; a scale inhibitor; a gas hydrate inhibitor, a mutual solvent; an oxidizer; a reducer; a friction reducer; a clay stabilizing agent; an oxygen scavenger; and any combination thereof.

The treatment fluid can have desirable properties that can affect the pumpability and suspending capability of the fluid. The treatment fluid can have a plastic viscosity in the range of 10 to 150 centipoise (cP), or 20 to 100 cP at a temperature of 120° F. (82.2° C.). The plastic viscosity can also be in a range such that the treatment fluid is pumpable. The treatment fluid can have a yield point in the range of 5 to 100 pounds per 100 sq. ft. (lb/100 ft$^2$) at a temperature of 120° F. (82.2° C.). The treatment fluid can also have a yield point in a range such that insoluble materials are suspended in the base fluid.

The methods can include mixing the base fluid and the lost-circulation package together. According to any of the embodiments, the methods include the step of introducing the treatment fluid into a subterranean formation. The subterranean formation can be penetrated by a wellbore. The well can be an oil, gas, or water production well, a geothermal well, or an injection well. The well can be an on-shore well or an off-shore well. The well includes the wellbore. The subterranean formation can be part of a reservoir or adjacent to a reservoir. The treatment fluid can be a drilling fluid, and the step of introducing the treatment fluid can be for the purpose of drilling the wellbore. The drilling fluid can be in a pumpable state before and during introduction into the subterranean formation. The drilling fluid can be pumped through a drill bit or through other components such as open-ended components or through a bypass sub. The well can include an annulus. The step of introducing the treatment fluid can include introducing the treatment fluid into a portion of the annulus. The treatment fluid can also be a spacer fluid, a workover fluid, a cement composition, or a stimulation fluid. The methods can also include introducing one or more additional fluids before and/or after the step of introducing the treatment fluid. The treatment fluid can be circulated out of the wellbore to the surface, flowed through a shale shaker, and re-introduced into the subterranean formation. The methods can further include adding additional particles of the lost-circulation materials of the lost-circulation package (e.g., more of the first lost-circulation material, more of the second first lost-circulation material, more of the third first lost-circulation material, etc. or combinations thereof) to the treatment fluid after flowing the fluid through the shale shaker and before re-introducing the fluid into the formation. This embodiment can be useful if the desired concentration of each of the lost-circulation materials are not maintained in the treatment fluid after flowing the fluid through the shale shaker, for example, if some of one or more of the lost-circulation materials are retained within the screen of the shale shaker.

The methods can include causing or allowing at least a portion of the lost-circulation materials of the lost-circulation package to reduce loss of the base fluid into permeable areas of the subterranean formation. The methods can include causing or allowing at least a portion of the plurality of particles of the lost-circulation package to form a plug in the permeable areas of the subterranean formation.

An embodiment of the present disclosure is a treatment fluid comprising a base fluid; and a lost-circulation package comprising a plurality of particles of: (i) a first lost-circulation material, wherein the first lost-circulation material is cellulose; (ii) a second lost-circulation material, wherein the second lost-circulation material is sized calcium carbonate; and (iii) a third lost-circulation material, wherein the third lost-circulation material is fibers, wherein the plurality of particles has a particle size distribution of a d10 value in the range of 30 to 55 microns, a d50 value in the range of 60 to 100 microns, and a d90 value in the range of 130 to 190 microns. Optionally, the treatment fluid is a drilling fluid. Optionally, the base fluid comprises a hydrocarbon liquid, water, or a combination of a hydrocarbon liquid and water. Optionally, the first lost-circulation material is in a concentration in the range of 15% to 45% by weight of the lost-circulation package. Optionally, the sized calcium carbonate of the second lost-circulation material has a median particle size in the range of 3 to 10 micrometers. Optionally, the second lost-circulation material is in a concentration in the range of 30% to 55% by weight of the lost-circulation package. Optionally, the fibers of the third lost-circulation material are finely ground fibrous cellulosic material. Optionally, the third lost-circulation material is in a concentration in the range of 5% to 30% by weight of the lost-circulation package. Optionally, the lost-circulation package further comprises a plurality of particles of a fourth lost-circulation material, wherein the fourth lost-circulation material is sized calcium carbonate, and wherein the fourth lost-circulation material has a different median particle size from the second lost-circulation material. Optionally, the fourth lost-circulation material has a median particle size in the range of 20 to 50 micrometers. Optionally, the lost-circulation package further comprises a plurality of particles of a fifth lost-circulation material, and wherein the fifth lost-circulation material is ground grape pomace. Optionally, the lost-circulation package further comprises one or more additional lost-circulation materials, and wherein the one or more additional lost-circulation materials are in a concentration in the range of 0.5% to 10% by weight of the lost-circulation package. Optionally 80% to 100% of the plurality of particles of the lost-circulation package are sized to pass through a shaker screen having a pore size greater than or equal to 105 microns. Optionally, the particle size distribution of the plurality of particles of the lost-circulation package is selected such that the plurality of particles plugs permeable areas of a subterranean formation having a largest dimension ranging from 10 to 150 micrometers. Optionally, the plurality of particles of the lost-circulation package are in a concentration in the range of 2 to 40 pounds per barrel of the base fluid. Optionally, a test treatment fluid consisting of the base fluid and the lost-circulation package has a total fluid loss of less than 50 milliliters using a particle plugging test having a pore size less than or equal to 200 micrometers at a pressure differential of 10.3 megapascals and a temperature of 71° C.

Another embodiment of the present disclosure is a method of treating a portion of a subterranean formation comprising: introducing a treatment fluid into the subterranean formation, the treatment fluid comprising: a base fluid; and a lost-circulation package comprising a plurality of particles of: (i) a first lost-circulation material, wherein the first lost-circulation material is cellulose; (ii) a second lost-circulation material, wherein the second lost-circulation material is sized calcium carbonate; and (iii) a third lost-circulation material, wherein the third lost-circulation material is fibers, wherein the plurality of particles has a particle size distribution of a d10 value in the range of 30 to 55 microns, a d50 value in the range of 60 to 100 microns, and a d90 value in the range of 130 to 190 microns; and causing or allowing at least a portion of the plurality of particles of the lost-circulation package to reduce loss of the base fluid into permeable areas of the subterranean formation. Optionally, the treatment fluid is a drilling fluid. Optionally, the base fluid comprises a hydrocarbon liquid, water, or a combination of a hydrocarbon liquid and water. Optionally, the first lost-circulation material is in a concentration in the range of 15% to 45% by weight of the lost-circulation package. Optionally, the sized calcium carbonate of the second lost-circulation material has a median particle size in the range of 3 to 10 micrometers. Optionally, the second lost-circulation material is in a concentration in the range of 30% to 55% by weight of the lost-circulation package. Optionally, the fibers of the third lost-circulation material are finely ground fibrous cellulosic material. Optionally, the third lost-circulation material is in a concentration in the range of 5% to 30% by weight of the lost-circulation package. Optionally, the lost-circulation package further comprises a plurality of particles of a fourth lost-circulation material, wherein the fourth lost-circulation material is sized calcium carbonate, and wherein the fourth lost-circulation material has a different median particle size from the second lost-circulation material. Optionally, the fourth lost-circulation material has a median particle size in the range of 20 to 50 micrometers. Optionally, the lost-circulation package further comprises a plurality of particles of a fifth lost-circulation material, and wherein the fifth lost-circulation material is ground grape pomace. Optionally, the lost-circulation package further comprises one or more additional lost-circulation materials, and wherein the one or more additional lost-circulation materials are in a concentration in the range of 0.5% to 10% by weight of the lost-circulation package. Optionally, 80% to 100% of the plurality of particles of the lost-circulation package are sized to pass through a shaker screen having a pore size greater than or equal to 105 microns. Optionally, the particle size distribution of the plurality of particles of the lost-circulation package is selected such that the plurality of particles plugs permeable areas of a subterranean formation having a largest dimension ranging from 10 to 150 micrometers. Optionally, the plurality of particles of the lost-circulation package are in a concentration in the range of 2 to 40 pounds per barrel of the base fluid. Optionally, a test treatment fluid consisting of the base fluid and the lost-circulation package has a total fluid loss of less than 50 milliliters using a particle plugging test having a pore size less than or equal to 200 micrometers at a pressure differential of 10.3 megapascals and a temperature of 71° C. Optionally, the method further comprises causing or allowing at least a portion of the plurality of particles of the lost-circulation package to form a plug in the permeable areas of the subterranean formation. Optionally, the method further comprises circulating the treatment fluid out of a wellbore that penetrates the subterranean formation after the step of introducing; then flowing the treatment fluid through a shale shaker; and then re-introducing the treatment fluid into the subterranean formation. Optionally, the method further comprises adding additional particles of the lost-circulation package to the treatment fluid after flowing the treatment fluid through the shale shaker and before re-introducing the treatment fluid into the subterranean formation.

The exemplary treatment fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure. It should also be noted that while FIG. 1 and the discussion of the FIGURE is for a drilling operation and fluid, other types of treatment fluids, such as spacer fluids, workover fluids, and stimulation fluids can be used with the disclosed equipment.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

One or more additional fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the additional fluids can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the disclosed fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

EXAMPLES

To facilitate a better understanding of the various embodiments, the following examples are given.

As used herein, "permeability plugging testing" of a test treatment fluid is tested using a permeability plugging apparatus developed and marketed by FANN® instruments. The Permeability Plugging Apparatus (PPA) is a high pressure, high temperature instrument designed to simulate downhole static filtration. The PPA operates at temperatures and pressures that represent well conditions, and the filtration medium is positioned above the sample fluid. The filter media is a ceramic disc. These discs closely simulate the structure of the formation, providing a more authentic representation of the filter cake that is actually being developed on the wall of the formation. Ceramic discs are available in several pore sizes.

Permeability plugging testing was performed at a specified temperature and pressure differential using API 13B-1 or 13B-2 testing procedures as follows. The jacket of the PPA is pre-heated to the specified testing temperature. The base fluid of the test fluid is mixed with any ingredients, such as a weighting agent and the lost-circulation materials, in a low shear mixer at a high enough revolutions per minute (rpm) such that a vortex of approximately 0.5 inches (in.) is created for 5 minutes (min.). The PPA test cell is then pressurized to the specified testing pressure. The test fluid is then poured into a standard permeability plugging apparatus (PPA) test cell. An appropriately sized disk and the back pressure assembly or LCM evaluation receiver are placed on the test cell. A timer that is set for 30 minutes is started. The filtrate valve is opened by turning it counterclockwise ½ turn to start the filtration. The cell pressure, indicated on the pump gauge, will drop initially. The pump is manually operated to maintain the desired test pressure. One minute after the valve is opened and the desired pressure is applied, the drain valve is opened on the backpressure receiver and the filtrate is collected. Continue to collect the liquid until the reservoir blows dry. The drain valve is then shut. The filtrate volume should be recorded as the initial spurt loss. Apply additional pressure to the cell in order to maintain a constant test pressure and on the backpressure receiver for the duration of the test. After 30 minutes has elapsed, close the filtrate valve, and drain all the filtrate from the backpressure receiver into the graduated cylinder. Record the total volume of filtrate in the graduate cylinder as total filtrate.

A composite lost-circulation package ("composite LCP") was prepared using five different lost-circulation materials ("LCM") and their concentrations as shown in Table 1 below. The composite LCP had a particle size distribution of 46 microns d10; 83 microns d50; and 169 microns d90. Cellulose B is a non-toxic, natural, cellulosic dust particle. BAROFIBRE® SF product is a non-toxic, fibrous, cellulosic material. BAROFIBRE® 0 product is a ground grape pomace material available from Halliburton Energy Services, Inc. BARACARB® 5 and 25 products are a sized calcium carbonate or ground marble material having a median particle size of 5 microns or 25 microns, respectively, available from Halliburton Energy Services, Inc.

TABLE 1

| Lost-circulation material | Concentration (% by weight) |
| --- | --- |
| Cellulose B | 30% |
| BAROFIBRE ® SF LCM | 20% |
| BAROFIBRE ® O LCM | 5% |
| BARACARB ® 5 LCM | 40% |
| BARACARB ® 25 LCM | 5% |

Sieve analysis was performed on the composite LCP to determine the quantity of the plurality of particles of the lost-circulation materials that would pass through different sized screens of a shale shaker. The results are listed below in Table 2. The US mesh number is presented along with the approximate size of the pores in units of micrometers. As can be seen, even with a US 200 mesh (~74 microns), which may have pore sizes too small to be used in oil and gas operations, almost 60% of the plurality of particles still passed through the screen. This indicates, that only 40% of the lost-circulation materials may need to be added back to the treatment fluid before being re-introduced into the subterranean formation. When comparing a pore size more commonly used in drilling operations, over 80% of the plurality of particles pass through a 120-mesh screen (~125 microns). This indicates that the particle size distribution of the lost-circulation package can be tailored to allow a desired percentage of the plurality of particles to pass through screens having a wide variety of pore sizes.

TABLE 2

| US # mesh number | Pore size (microns) | % Pass through of composite LCP |
|---|---|---|
| 35 | 500 | 99.85 |
| 40 | 400 | 99.55 |
| 45 | 354 | 98.90 |
| 50 | 297 | 97.81 |
| 60 | 250 | 96.36 |
| 70 | 210 | 94.72 |
| 80 | 177 | 92.48 |
| 100 | 149 | 89.54 |
| 120 | 125 | 83.02 |
| 140 | 105 | 79.48 |
| 170 | 88 | 72.61 |
| 200 | 74 | 59.66 |
| 270 | 53 | 39.14 |
| 325 | 44 | 17.83 |

Various test fluids were tested for particle plugging testing at a temperature of 160° F. (71° C.) and a differential pressure of either 500 psi or 1,500 psi across ceramic disks having various pore sizes in micrometers (microns). Each of the test fluids had a total density of 9.3 ppg and contained a base fluid of water containing 8.8 ppg of sodium chloride (brine) and other ingredients. The ingredients and concentrations (ppb) of the test fluids are shown below in Table 3. Control fluid #1 and test fluids #2 and #3 included calcium carbonate fines in addition to lost-circulation materials. The fluids also contained other ingredients of filtration control additive of a modified and bacterially stabilized starch, a viscosifier of powdered xanthan gum, a first corrosion inhibitor containing amine/phosphonate, a second corrosion inhibitor, a triazine-based liquid hydrogen sulfide ($H_2S$) scavenger, an ester-based lubricant derived from fats and oils, an oxygen scavenger. The fluids also included a blend of other lost-circulation materials ("other LCM") or the composite lost-circulation package ("Composite LCP") from Table 1.

TABLE 3

| Ingredient | Control 1 | #2 | #3 | Control 4 | #5 | #6 | #7 |
|---|---|---|---|---|---|---|---|
| Brine | 332.7 | 332.7 | 332.7 | 332.7 | 332.7 | 332.7 | 332.7 |
| Caustic Soda | 0.5 | 0.5 | 0.5 | 0.5 | 0.5 | 0.5 | 0.5 |
| Soda Ash | 0.5 | 0.5 | 0.5 | 0.5 | 0.5 | 0.5 | 0.5 |
| Filtration control | 6.0 | 6.0 | 6.0 | 6.0 | 6.0 | 6.0 | 6.0 |
| Viscosifier | 1.9 | 1.9 | 1.9 | 1.9 | 1.9 | 1.9 | 1.9 |
| $1^{st}$ Corrosion inhibitor | 0.5 | 0.5 | 0.5 | 0.5 | 0.5 | 0.5 | 0.5 |
| $2^{nd}$ Corrosion inhibitor | 1.5 | 1.5 | 1.5 | 1.5 | 1.5 | 1.5 | 1.5 |
| $H_2S$ scavenger | 1.0 | 1.0 | 1.0 | 1.0 | 1.0 | 1.0 | 1.0 |
| Lubricant (3% v/v) | 10.5 | 10.5 | 10.5 | 10.5 | 10.5 | 10.5 | 10.5 |
| Oxygen scavenger | 0.8 | 0.8 | 0.8 | 0.8 | 0.8 | 0.8 | 0.8 |
| Calcium Carbonate Fine | 25.3 | 25.3 | 25.3 | — | — | — | — |
| Other LCM | — | 8.0 | — | — | 8.0 | — | — |
| Composite LCP | — | — | 8.0 | — | — | 8.0 | 20.0 |

The results of the permeability plugging testing (PPT) of the test fluids are shown below in Table 4 for control fluid #1 and fluids #2 and #3, in Table 5 for control fluid #4 and fluids #5 and #6, and in Tables 6 and 7 for fluid #7. Spurt loss and total fluid loss (FL) are reported in milliliters.

TABLE 4

| Ceramic Disc pore size | Control 1 | | | | Fluid #2 | | | | Fluid #3 | | | |
|---|---|---|---|---|---|---|---|---|---|---|---|---|
| (microns) | 10 | 20 | 40 | 55 | 10 | 20 | 40 | 55 | 10 | 20 | 40 | 55 |
| | Pressure 500 psi | | | | | | | | | | | |
| Spurt loss (mL) | 2 | 16 | 38 | 50 | 4.4 | 8.8 | 30 | 36 | 0.4 | 1.2 | 26 | 32 |
| Total FL (mL) | 12 | 24 | 46 | 58 | 10.8 | 15.2 | 40 | 44 | 7.6 | 10 | 34 | 40 |

TABLE 4-continued

| Ceramic Disc pore size (microns) | Control 1 | | | | Fluid #2 | | | | Fluid #3 | | | |
|---|---|---|---|---|---|---|---|---|---|---|---|---|
| | 10 | 20 | 40 | 55 | 10 | 20 | 40 | 55 | 10 | 20 | 40 | 55 |
| Pressure 1,500 psi | | | | | | | | | | | | |
| Spurt loss (mL) | 7.6 | 24 | 54 | 82 | 6.4 | 20 | 46 | 56 | 3.6 | 12 | 30 | 40 |
| Total FL (mL) | 18 | 36 | 62 | 94 | 16 | 28 | 54 | 64 | 12.4 | 20 | 38 | 48 |

As can be seen in Table 4, fluid #3 that included the composite LCP blend of 5 different lost-circulation materials exhibited superior performance—even at a pressure of 1,500 psi—compared to fluid #2 that included the other lost-circulation material. Even though the control fluid #1 did provide some fluid loss control, these fluids all contained 25 ppb of additional calcium carbonate fine.

TABLE 5

| Ceramic Disc pore size (microns) | Control 4 | | | Fluid #5 | | | Fluid #6 | | |
|---|---|---|---|---|---|---|---|---|---|
| | 10 | 20 | 40 | 10 | 20 | 40 | 10 | 20 | 40 |
| Pressure 500 psi | | | | | | | | | |
| Spurt loss (mL) | No plugging of Disc | | | 8.8 | 20 | 48 | 1.6 | 9.6 | 34 |
| Total FL (mL) | | | | 16 | 28 | 56 | 12 | 14.4 | 42 |
| Pressure 1,500 psi | | | | | | | | | |
| Spurt loss (mL) | No Plugging of Disc | | | 20 | 28 | 54 | 2.4 | 6 | 38 |
| Total FL (mL) | | | | 28 | 36 | 62 | 14.4 | 20 | 46 |

As can be seen in Table 5, fluid #6 that included the composite lost-circulation package blend of 5 different lost-circulation materials exhibited superior performance at both pressures compared to fluid #5 that included other lost-circulation material. Control fluid #4, which did not include calcium carbonate fine like control fluid #1 did, was not able to plug even the smallest pore sized disc at 10 microns. The results in Tables 4 and 5 indicate that the plurality of particles of the lost-circulation package with the particle size distribution listed above provides excellent fluid loss control at a concentration of 8 ppb.

TABLE 6

| | Fluid #7 | | |
|---|---|---|---|
| Ceramic Disc pore size (microns) | 120 | 150 | 190 |
| Pressure 1,500 psi | | | |
| Spurt loss (mL) | 14 | 34 | 50 |
| Total FL (mL) | 26 | 50 | 70 |

TABLE 7

| | Fluid #7 |
|---|---|
| Metal Slotted Disc width (microns) | 203 |
| Pressure 1,500 psi | |
| Fluid loss/30 min (mL) | 10 |

Fluid #7 was used to test fluid loss control using the composite LCP in larger pore sizes. The largest ceramic disc pore size available is 190 microns. Therefore, a metal disc with a slot having a width of 203 microns was used in order to test permeable area dimensions up to 200 microns. The metal slotted disc testing was performed according to the procedure for ANSI/API 13I Recommended Practice for Laboratory Testing of Drilling Fluids, section 11.4 or ANSI/API 13B-2 Recommended Practice for Field Testing of Oil-based Drilling Fluids, section 7.2.2 and is reported in fluid loss per 30 minutes. As can be seen in Table 6, fluid #7 was able to provide good fluid loss control at 1,500 psi with pore sizes up to 150 microns (100 mesh). The fluid loss was not good for a pore size of 190 microns. However, as can be seen in Table 7, excellent fluid loss control was obtained when a metal disc was used to simulate a fracture instead of a pore. Accordingly, the LCM package should perform well under any wellbore pressures and a wide variety of permeable areas, such as interconnected pores and fractures, having dimensions up to 200 microns.

Therefore, the various embodiments are well adapted to attain the ends and advantages mentioned as well as those that are inherent therein. The particular embodiments disclosed above are illustrative only, as the various embodiments may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps. It should also be understood that, as used herein, "first," "second," and "third," are assigned arbitrarily and are merely intended to differentiate between two or more lost-circulation materials, etc., as the case may be, and do not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent(s) or other documents that may be incorporated herein by reference, the definitions that are consistent with this specification should be adopted.

What is claimed is:

1. A treatment fluid comprising:
   a base fluid; and
   a lost-circulation package comprising a plurality of particles of:
   (i) a first lost-circulation material, wherein the first lost-circulation material is cellulose;
   (ii) a second lost-circulation material, wherein the second lost-circulation material is sized calcium carbonate, and wherein the second lost-circulation material is in a concentration in the range of 30% to 55% by weight of the lost-circulation package; and
   (iii) a third lost-circulation material, wherein the third lost-circulation material is fibers,
   wherein the plurality of particles has a particle size distribution of a d10 value in the range of 30 to 55 microns, a d50 value in the range of 60 to 100 microns, and a d90 value in the range of 130 to 190 microns.

2. The treatment fluid according to claim 1, wherein the treatment fluid is a drilling fluid.

3. The treatment fluid according to claim 1, wherein the base fluid comprises a hydrocarbon liquid, water, or a combination of a hydrocarbon liquid and water.

4. The treatment fluid according to claim 1, wherein the first lost-circulation material is in a concentration in the range of 15% to 45% by weight of the lost-circulation package.

5. The treatment fluid according to claim 1, wherein the sized calcium carbonate of the second lost-circulation material has a median particle size in the range of 3 to 10 micrometers.

6. The treatment fluid according to claim 1, wherein the fibers of the third lost-circulation material are natural fibers of finely ground fibrous cellulosic material.

7. The treatment fluid according to claim 1, wherein the third lost-circulation material is in a concentration in the range of 5% to 30% by weight of the lost-circulation package.

8. The treatment fluid according to claim 1, wherein the lost-circulation package further comprises a plurality of particles of a fourth lost-circulation material, wherein the fourth lost-circulation material is sized calcium carbonate, and wherein the fourth lost-circulation material has a different median particle size from the second lost-circulation material.

9. The treatment fluid according to claim 8, wherein the fourth lost-circulation material has a median particle size in the range of 20 to 50 micrometers.

10. The treatment fluid according to claim 1, wherein the lost-circulation package further comprises a plurality of particles of a fifth lost-circulation material, and wherein the fifth lost-circulation material is ground grape pomace.

11. The treatment fluid according to claim 1, wherein the lost-circulation package further comprises one or more additional lost-circulation materials, and wherein the one or more additional lost-circulation materials are in a concentration in the range of 0.5% to 10% by weight of the lost-circulation package.

12. The treatment fluid according to claim 1, wherein 80% to 100% of the plurality of particles of the lost-circulation package are sized to pass through a shaker screen having a pore size greater than or equal to 105 microns.

13. The treatment fluid according to claim 1, wherein the particle size distribution of the plurality of particles of the lost-circulation package is selected such that the plurality of particles plugs permeable areas of a subterranean formation having a largest dimension ranging from 10 to 150 micrometers.

14. The treatment fluid according to claim 1, wherein the plurality of particles of the lost-circulation package are in a concentration in the range of 2 to 40 pounds per barrel of the base fluid.

15. The treatment fluid according to claim 1, wherein a test treatment fluid consisting of the base fluid and the lost-circulation package has a total fluid loss of less than milliliters using a particle plugging test having a pore size less than or equal to 200 micrometers at a pressure differential of 10.3 megapascals and a temperature of 71° C.

16. A method of treating a subterranean formation comprising:
    introducing a treatment fluid into the subterranean formation, the treatment fluid comprising:
    a base fluid; and
    a lost-circulation package comprising a plurality of particles of:
    (i) a first lost-circulation material, wherein the first lost-circulation material is cellulose;
    (ii) a second lost-circulation material, wherein the second lost-circulation material is sized calcium carbonate, and wherein the second lost-circulation material is in a concentration in the range of 30% to 55% by weight of the lost-circulation package; and
    (iii) a third lost-circulation material, wherein the third lost-circulation material is fibers,
    wherein the plurality of particles has a particle size distribution of a d10 value in the range of 30 to 55 microns, a d50 value in the range of 60 to 100 microns, and a d90 value in the range of 130 to 190 microns; and
    causing or allowing at least a portion of the plurality of particles of the lost-circulation package to reduce loss of the base fluid into permeable areas of the subterranean formation.

17. The method according to claim 16, further comprising causing or allowing at least a portion of the plurality of particles of the lost-circulation package to form a plug in the permeable areas of the subterranean formation.

18. The method according to claim 16, further comprising:
    circulating the treatment fluid out of a wellbore that penetrates the subterranean formation after the step of introducing;
    then flowing the treatment fluid through a shale shaker; and then re-introducing the treatment fluid into the subterranean formation.

19. The method according to claim 18, further comprising adding additional particles of the lost-circulation package to the treatment fluid after flowing the treatment fluid through the shale shaker and before re-introducing the treatment fluid into the subterranean formation.

* * * * *